United States Patent [19]

Leventer

[11] 4,218,697
[45] Aug. 19, 1980

[54] DIGITAL DATA TRANSMISSION ARRANGEMENT USING A STANDARD TV VIDEO

[76] Inventor: William Leventer, 62 Sutton Pl., Lawrence, N.Y. 11559

[21] Appl. No.: 37,127

[22] Filed: May 8, 1979

[51] Int. Cl.² ............................................. H04N 7/00
[52] U.S. Cl. ....................................... 358/13; 358/147
[58] Field of Search ................... 358/12, 13, 11, 21 R, 358/143, 147, 141

[56] References Cited

U.S. PATENT DOCUMENTS

| | | | |
|---|---|---|---|
| 3,493,674 | 2/1970 | Houghton | 358/147 |
| 3,982,064 | 9/1976 | Barnaby | 358/147 |

FOREIGN PATENT DOCUMENTS 2419280  6/1975  Fed. Rep. of Germany ............ 358/147

OTHER PUBLICATIONS

"Wireless World Teletext Decoder", Daniels, Wireless World vol. 81, No. 1480, pp. 563-566, Dec. 1975.

"Oracle-Broadcasting the Written Word", James, Wireless World, Jul. 1973, pp. 314-316.

Primary Examiner—Robert L. Griffin
Assistant Examiner—Michael A. Masinick
Attorney, Agent, or Firm—Toren, McGeady and Stanger

[57] ABSTRACT

An arrangement for providing digital encoding and decoding of information, which encoding is performed on a standard TV video signal, is disclosed. The encoding scheme utilizes the four standard signals R, G, B, Y which are available from any color transmission system. These four signals are the luminance information, Y, the red chroma excitation level, R, the green chroma excitation level, G, and the blue chroma excitation level, B. The encoding arrangement utilizes the color subcarrier (3.579545 MHz) as a reference to derive a clock at ⅓ of the subcarrier frequency and a clock at 1/6 of the subcarrier frequency. Clocks at these frequencies are used to modulate the luminance and the chroma information. Apparatus for encoding and synchronized decoding are disclosed. The suggested portion, in the television signal, for the encoded data is within the vertical interval.

14 Claims, 4 Drawing Figures

4,218,697

DIGITAL DATA TRANSMISSION ARRANGEMENT USING A STANDARD TV VIDEO

FIELD OF THE INVENTION

The present invention relates to an arrangement for transmitting digitized data during the transmission of a standard color television picture.

BACKGROUND OF THE INVENTION

In the transmission of a color picture, the transmitting source and the receiving device must both be synchronized to a common frequency carrier in order that the color information of the picture be properly reproduced. Thus, in addition to the picture information, color synchronizing information must be transmitted simultaneously. In a color television system, the color synchronizing information is transmitted as a signal known as the "color burst". The color burst is used with appropriate standard circuits to synchronize an oscillator in the television receiver.

The color transmission systems used (NTSC standards), when properly modulated and demodulated, result in four distinct signals which are available simultaneously in the TV receiver from a single incoming signal. These four signals are:

A. Luminance information (black and white instantaneous brightness)
B. Red chroma excitation level
C. Green chroma excitation level
D. Blue chroma excitation level Each one of these signals can be derived independently of the other by proper demodulation techniques. The approximate bandwidth for luminance is 2 MHz and for each chroma signal is 0.5 MHz.

It is an object of the present invention to utilize these signals for encoding digital information and then incorporating these encoded signals within the transmission of a standard television picture. It is a further object of the present invention to incorporate these encoded signals during a specific portion of the television signal, namely, during the vertical interval of the television signal.

SUMMARY OF THE PRESENT INVENTION

In accordance with the present invention, a system for transmitting encoded digital data in a standard color TV signal comprises means for providing up to three digital data input signals, means for providing a clock frequency signal and means, synchronized with the clock frequency signal, for modulating red, green and blue chrominance signals with corresponding ones of said data input signals. Also included are means, synchronized with the clock frequency signal, for modulating a luminance signal, means for combining said modulated chrominance signals and modulated luminance signal to provide an encoded video output signal and means for inserting the encoded video output signal during a selected portion of a standard video signal.

In a preferred form of the invention, the inserting means inserts the encoded video signal during the vertical retrace interval of a standard video transmission signal. In another preferred form, there is included means for receiving a transmitted signal including a standard video portion and said encoded portion and means, synchronized with the clock frequency, for decoding the encoded data portion.

For a better understanding of the present invention, reference is made to the following description and accompanying drawings, while the scope of the present invention will be pointed out in the appended claims.

DESCRIPTION OF THE PREFERRED EMBODIMENT

Before discussing the specific nature of the preferred embodiment of the present invention, it is worthwhile to consider the capabilities of a standard television signal. The present invention intends to utilize the vertical interval of this standard signal for the encoding of data although the general technique for encoding and decoding digital data is not so limited.

Figure 3:
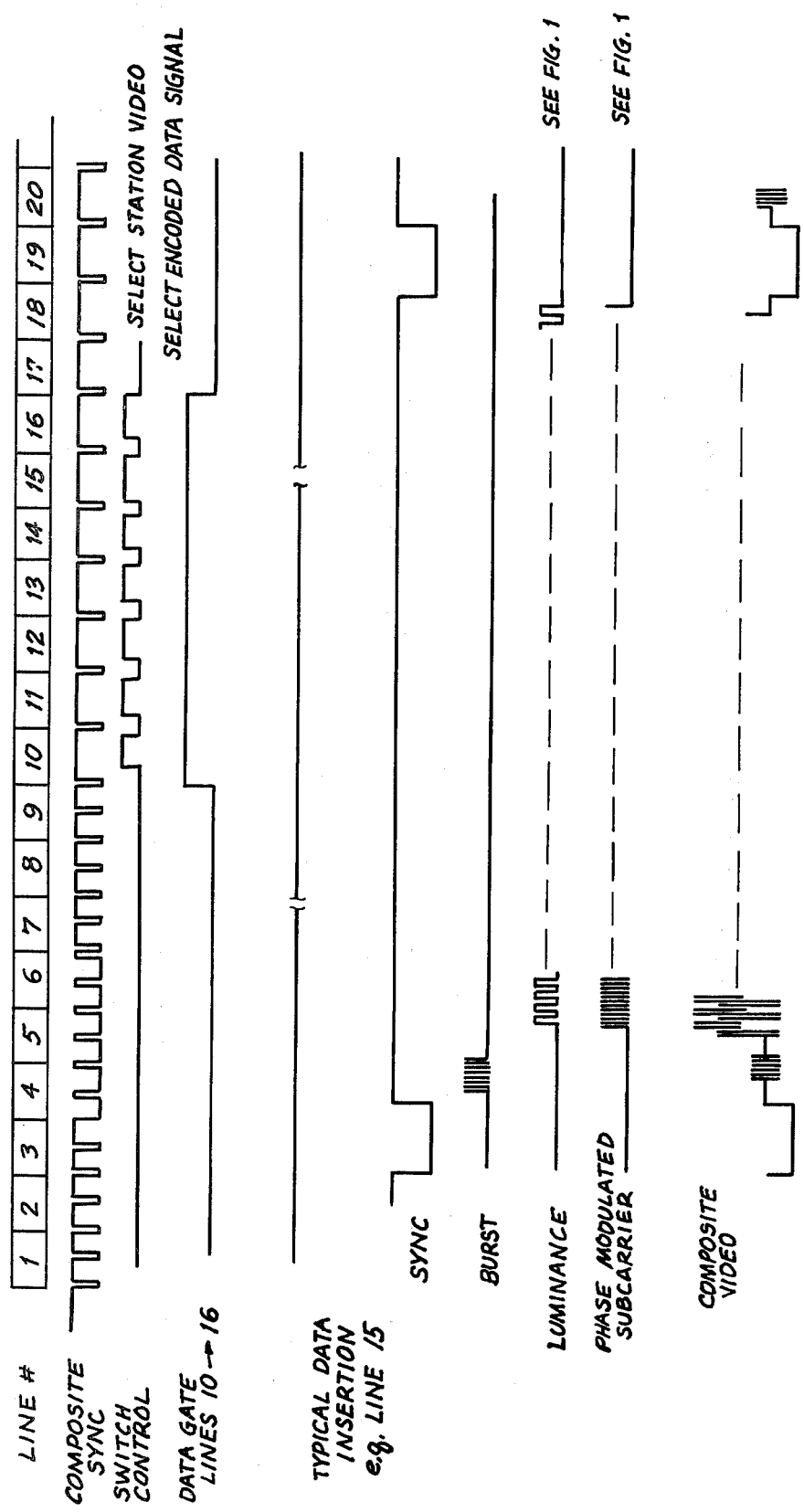
FIG. 3 is a diagram showing a typical composite video signal with encoded data and the preferred portion within said video signal for placing the data.

In order to avoid degrading the visible picture of a transmitted television signal, a preferred form of the invention thus encodes data in the vertical interval of the television signal. Referring to FIG. 3, there are 21 scan lines in the vertical interval. Lines 1–9 are used for vertical sync information, lines 17–20 are used for various vertical interval reference (VIR) signals, and line 21 is blank. Thus, lines 10–16 are available for other use. In the seven lines available, it is possible to transmit for 52 microseconds per line (the unblanked portion of the line). With a color modulation bandwidth of approximately 0.5 megahertz, approximately 30 color changes are available on each scan line. Thus, 30×3 or 90 bits per scan line can be easily supplied. In seven scan lines, there are 630 bits and with a field rate of 60 per second, the data rate is equivalent to 37,800 bits per second.

Using the color subcarrier (3.579545 MHz) as a reference, the transmitting portion of the invention will derive a clock at ⅓ of the subcarrier frequency, i.e., 3.58/3 or 1.193 MHz, and a clock at 1/6 of the subcarrier frequency, i.e., 3.58/6 or approximately 0.573 MHz. It should be understood that the present invention is not limited to such a relationship and multiples as well as submultiples of the subcarrier frequency are within the scope of the present invention. There is also the possibility of employing a separate clock frequency generator which is not synchronized with the color subcarrier signal.

Figure 1:
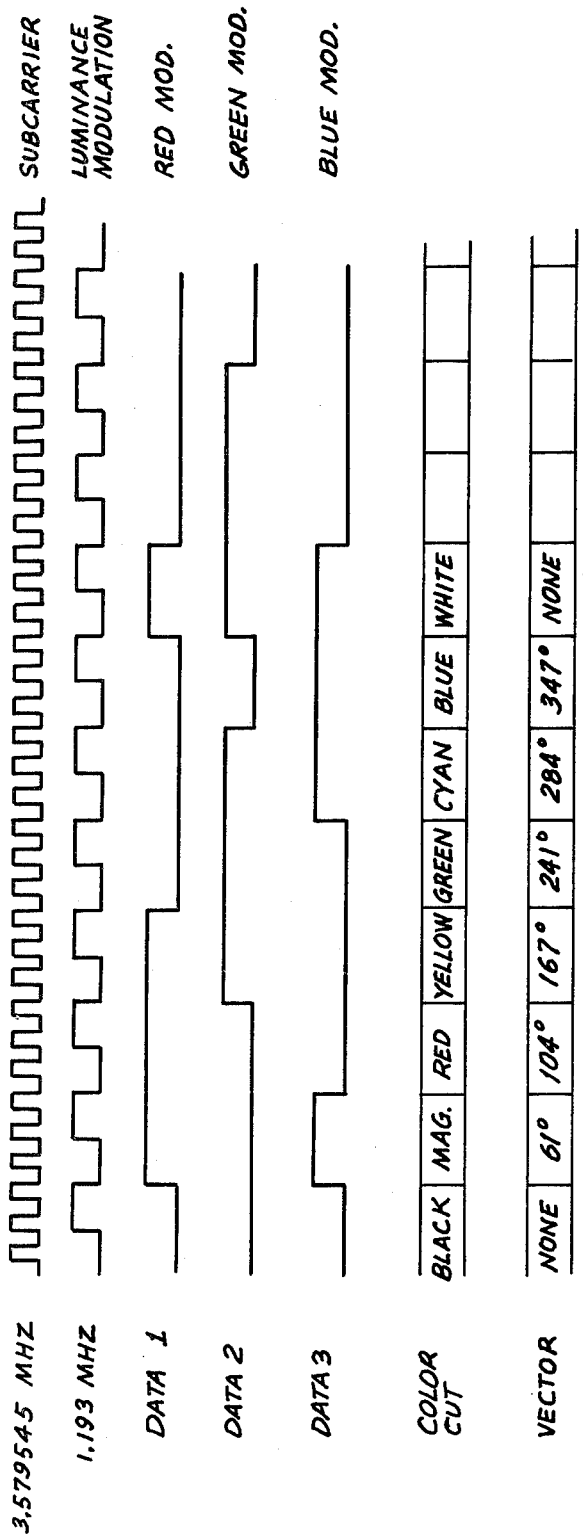
FIG. 1 illustrates a timing diagram of signals relating to color timing and phase modulation, showing a typical data stream for each of the three primary color signals.

Reference is now made to the timing diagram shown in FIG. 1. The 1.193 MHz clock is used to modulate the (Y) luminance level of the signal. The 0.573 MHz clock is used to supply data to the respective R, G, B modulation circuits. Each of these three signals (data #1, #2 and #3) and may be obtained from different data sources. Thus, the composite video signal will contain a data clock and three data bit streams, encoded as primary colors, all synchronized to the 3.58 MHz subcarrier. The demodulator will be capable of extracting all four of these signals using standard color demodulation techniques. FIG. 1 shows, for all eight combinations of the three simultaneous data inputs, the resulting "color" modulation vectors obtained.

At the demodulator, the derived clock from the Y signal is locked to the color subcarrier by using the subcarrier as a sampling clock. Thus, available at the receiver, is a master clock and three different data sources synchronized to this clock.

Figure 2:
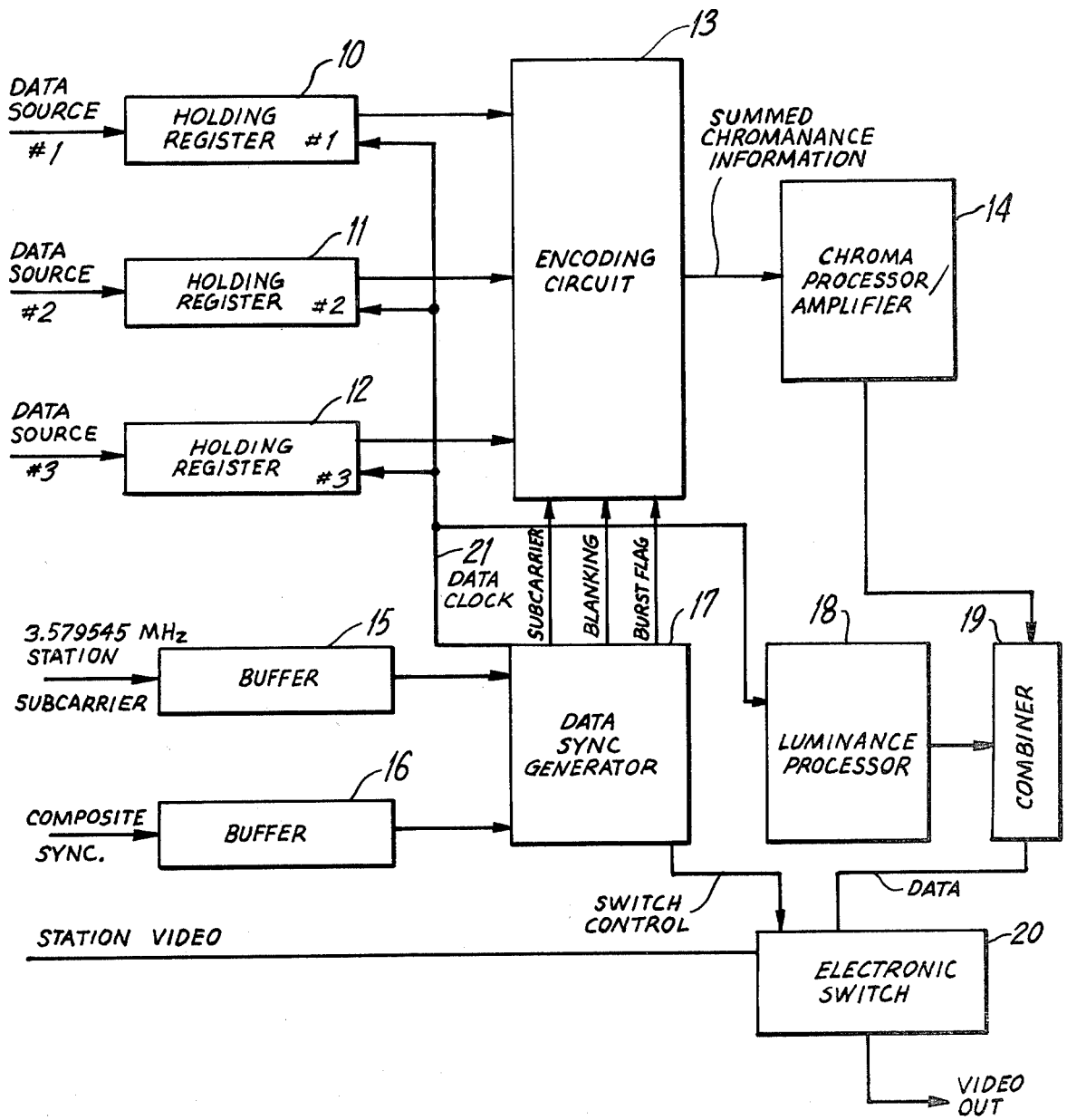
FIG. 2 is a block diagram of an encoder device of the present invention.

Now referring to FIG. 2, shown there is a block circuit diagram for the encoding of digital data. It will be seen that this arrangement is substantially similar to encoding means used to produce standard color picture information. A preferred encoding approach utilizes all-digital techniques so that the entire system can be implemented with low cost digital integrated circuitry and with a minimum number of discrete components. This approach also lends itself to ultimately making systems using the disclosed techniques available at prices suitable for consumer applications by implementing integrated circuit technology.

In FIG. 2, the three data sources #1, #2 and #3 are signals which will be encoded into the R, G and B chroma signals. The incoming data for each source is held in a "holding register" or memory until it is needed. These registers, indicated as 10, 11 and 12 in FIG. 2, have a capacity which corresponds to the number of bits per scan line. The holding register will typically be of the shift register type. Data can be entered, during the blanking portion of the scan line, for example, in either parallel or serial form from the data source. During the transmission time, the unblanked portion of the scan line, the contents of the holding register will be shifted out bit by bit by means of the data clock 21, the signal which will modulate the luminance. The stream of ones and zeros at the output of each holding register is then used to turn on and off, respectively, each of the three color hue generators of the encoding circuit 13.

Station sync signals, in this case the station subcarrier, the composite sync signal, the composite blanking signal, the vertical drive signal, and the burst flag signal, are applied to buffers 15 and 16 where they are shaped for use by the timing circuitry which is embodied in the data sync generator 17. Buffers 15 and 16 are most typically level converters. The timing circuitry determines from station sync, the gating and clocking signals required to supply the digital information to the chroma processor amplifier 14.

The outputs of data sync generator 17 are supplied to the encoding circuit 13. These outputs include the subcarrier signal, the blanking signal and the burst flag signal. Each of the digital signals at the outputs of the holding registers 1, 2 and 3 are used to gate a particular color excitation signal—red, green and blue. Additionally, the luminance component of the resulting composite video signal is derived from the data clock 21 and controls the luminance processor circuit 18. The luminance and chrominance signal are combined in combiner 19. The signal available at the output of the combiner is then switched into the station video by means of electronic switch 20. The resulting video output signal then contains all of the station video and the new information related to the digital data inputs.

Encoding circuit 13, chroma processor 14, luminance processor 18 and combiner 19 are fully disclosed in U.S. Pat. No. 3,939,487 issued Feb. 17, 1976 to the same inventor. The relevant disclosure of that patent is incorporated herein by reference.

In the timing diagram of FIG. 3, a typical composite video signal, including the data of one scan line, is shown. When the resultant video signal is applied to a receiving device equipped with the proper receiving circuitry, the digital data inputs can be recovered and used as desired.

Figure 4:
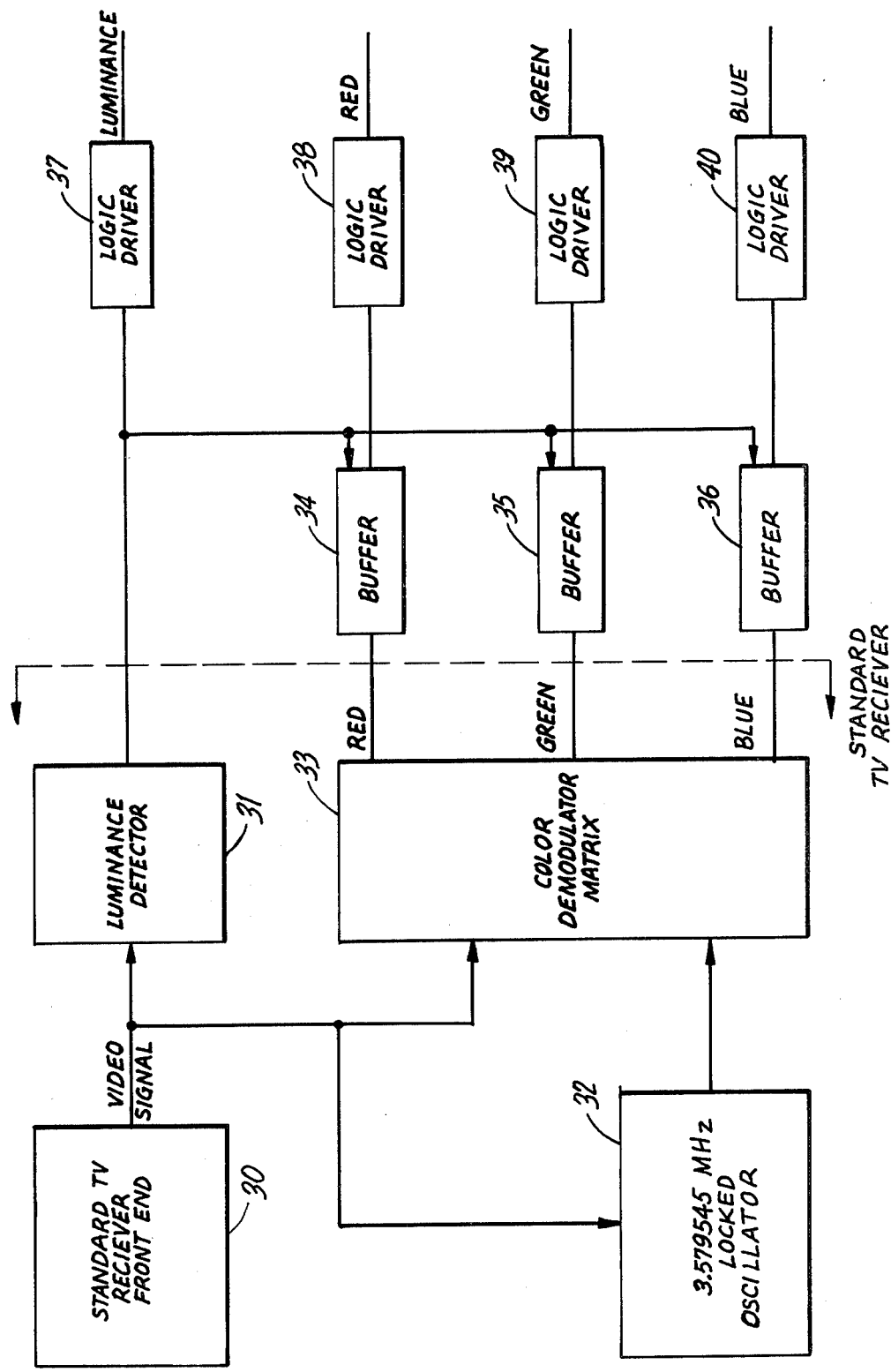
FIG. 4 is a block diagram of a decoder device of the present invention.

As a result of the encoding scheme utilized, the circuitry required to extract the data at the receiving end is substantially identical to standard color signal processing circuitry. A typical decoder is shown in FIG. 4. The incoming video signal is processed by front end circuitry 30 so that a standard composite video signal is made available. The 3.579545 MHz component of this video signal is supplied to a locked oscillator 32 in the conventional manner. Chroma and luminance information are also extracted in the conventional manner by luminance detector 31 and color demodulator matrix 33. The blocks 30, 31, 32 and 33 may be readily recognized as parts of a standard television receiver. The output of the luminance detector is employed as a strobe of the red, green and blue signal outputs of the matrix 33 at buffers 34, 35 and 36. Thus, the decoded outputs of the conventional television receiver (or monitor) chroma demodulators and luminance detector can be applied to ON-OFF type logic circuitry for use by the digital logic system which will handle the data. The recovered data, after suitable buffering by buffers 34, 35 and 36 and appropriate logic driver elements 37, 38, 39 and 40, will be identical to the input data originally shown in FIG. 1.

It should be noted that as a result of the derivation of the data clock (encoded as luminance) and the data gates (encoded as R, G, B chroma) from the subcarrier, the extracted digital data will always be sampled by a synchronous clock—and at the center point—to yield a virtually distortion immune system.

As understood from the above, while encoding was suggested to be performed in the vertical interval of the television signal, it can be performed in any chosen scan line or set of scan lines by the same approach.

The data rate chosen for this example is meant to indicate a readily obtainable rate to yield highly reliable data. Higher data rates may be used.

While the foregoing description and drawings represent the preferred embodiments of the present invention, it will be obvious to those skilled in the art that various changes and modifications may be made therein without departing from the true spirit and scope of the present invention.

What is claimed is:

1. A digital data TV transmission system for transmitting an encoded video signal within a standard video transmission signal comprising:

means for deriving a first clock signal which is an integral multiple or submultiple of the color subcarrier frequency;

means for deriving a second clock signal which is an integral multiple or submultiple of the color subcarrier frequency and which has a frequency less than or equal to the value of the frequency of the first clock signal;

data signal input means for providing digital signals for controlling red, green and blue excitation levels of a television signal;

luminance signal means for providing a signal corresponding to the luminance of a television signal;

encoding means responsive to said data signal means and said second clock signal means for providing modulated red, green and blue chrominance signals;

means responsive to said luminance signal and said first clock signal for providing a modulated luminance signal;

means for combining the modulated luminance signal and the modulated chrominance signals for providing an encoded video output signal; and synchronized switching means for inserting said encoded video output signal during a selected portion of a standard video transmission signal.

2. The system of claim 1, wherein said synchronized switching means inserts said encoded video output signal during the vertical retrace interval of a standard video transmission signal.

3. The system of claim 1, wherein said first clock signal means derives a signal having a frequency of ⅓ of the color subcarrier frequency.

4. The system of claim 1, wherein said second clock signal means derives a signal having a frequency of 1/6 of the color subcarrier frequency.

5. The system of claim 1, wherein said data input means includes three holding registers, each having a holding capacity corresponding to the number of bits on a scan line.

6. The system of claim 1, wherein said encoding means includes an encoding circuit for providing summed chrominance information and a chroma circuit for processing said summed chrominance information.

7. The system of claim 1, including means for receiving a transmitted television signal including a standard video portion and said encoded video portion and means for decoding said encoded video portion to recover the luminance modulation and the digital input signals.

8. The system of claim 7, wherein said receiving and decoding means includes a standard television receiver having a front end portion, a luminance detector, a color subcarrier frequency locked oscillator and a color demodulation matrix and means for strobing the red, green and blue outputs of the color demodulation matrix with the modulation signal detected by the luminance detector.

9. A system for transmitting encoded digital data in a standard color television video signal comprising:

means for providing up to three digital data input signals;

means, synchronized with the color subcarrier, for modulating red, green and blue chrominance signals with corresponding ones of said data input signals;

means, synchronized with the color subcarrier, for modulating a luminance signal;

means for combining said modulated chrominance signals and modulated luminance signal to provide an encoded video output signal; and means for inserting said encoded video output signal during a selected portion of a standard video signal.

10. The system of claim 9, wherein said inserting means inserts said encoded video signal during the vertical retrace interval of a standard video transmission signal.

11. The system of claim 9, including means for receiving a transmitted signal including a standard video portion and said encoded video portion and means, synchronized to said color subcarrier frequency, for decoding said encoded video portion.

12. A system for transmitting encoded digital data in a standard color television video signal comprising:

means for providing up to three digital data input signals;

means for providing a clock frequency signal;

means, synchronized with the clock frequency, for modulating red, green and blue chrominance signals with corresponding ones of said data input signals;

means, synchronized with the clock frequency for modulating a luminance signal;

means for combining said modulated chrominance and modulated luminance signal to provide an encoded video output signal; and means for inserting said encoded video output signal during a selected portion of a standard video signal.

13. The system of claim 12, wherein said inserting means inserts said encoded video signal during the vertical retrace interval of a standard video transmission signal.

14. The system of claim 12, including means for receiving a transmitted signal including a standard video portion and said encoded video portion and means, synchronized with said clock frequency, for decoding said encoded video portion.

* * * * *